United States Patent [19]

Checkland et al.

[11] 4,310,597

[45] Jan. 12, 1982

[54] LOW VOLTAGE ELECTRICAL WIRE

[75] Inventors: John A. Checkland, Pointe Claire; Paul Valois, Oka, both of Canada

[73] Assignee: Northern Telecom Limited, Montreal, Canada

[21] Appl. No.: 74,729

[22] Filed: Sep. 12, 1979

Related U.S. Application Data

[63] Continuation-in-part of Ser. No. 922,822, Jul. 10, 1978, abandoned.

[51] Int. Cl.[3] .......................... B32B 15/02; H01B 7/00

[52] U.S. Cl. .............................. 428/383; 174/120 SR; 428/372

[58] Field of Search ............... 428/375, 379, 383, 389, 428/372; 174/110 V, 120 SR; 525/305

[56] References Cited

U.S. PATENT DOCUMENTS 3,623,940 11/1971 Gladstone et al. ............. 174/110 V
3,843,402 10/1974 Albarino et al. .................... 428/379
3,998,715 12/1976 Bohm et al. ..................... 525/305 X
4,062,998 12/1977 Hagiwara et al. .................. 428/380

*Primary Examiner*—Lorraine T. Kendell
*Attorney, Agent, or Firm*—R. J. Austin

[57] ABSTRACT

Low voltage electrical wire with only two layers of insulation. An inner layer of polyolefin is covered by an outer layer of irradiation crosslinked material of a PVC based composition. The outer layer has abrasion and heat resistance but its material has an extensibility at break comparable with the conductor. To increase its capability to protect the conductor, the inner layer is capable of absorbing stresses and strains imposed axially upon the conductor so that while the inner surface of the inner layer extends with the conductor, relative movement of the molecules is possible throughout the depth of the inner layer. Thus, the outer layer restrains the outer surface of the inner layer from extending. The net result is that the outer layer extends less than the conductor and is capable of continued unbroken protection after the conductor has severed.

6 Claims, 1 Drawing Figure

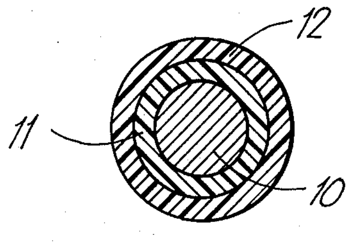
12
11
10

LOW VOLTAGE ELECTRICAL WIRE

This application is a continuation-in-part of U.S. patent application Ser. No. 922,822 filed July 10, 1978, now abandoned.

This invention relates to a low voltage electrical wire for telecommunications equipment and would be suitable for switchboard wiring and main frame wiring.

Low voltage electrical wires for telecommunications equipment need to be extremely flexible for the purpose for which they are made. The fact that the wires are of narrow diameter assists in achieving this object. These wires are used in switchboard or main frame wiring in which a great many, perhaps hundreds, of wires extend between many terminals in a relatively small space. Thus, the wires are twisted around each other and through frame members and follow tortuous paths. The flexibility of the wires is also of assistance in main frame wiring in that it is normal for each wire to be changed in position many times so that the shapes of its tortuous paths change as wiring is being constantly replaced and this involves the positional change in other wires as they are moved aside by telecommunications personnel to allow for accessibility.

In the close environment found in main frame wiring and switchboard wiring, abrasion resistance is also of particular importance because of the rubbing together of the different wires and also rubbing against frame members.

Thus, because of the need for flexibility, any insulation upon the conductor of such a wire needs to be as thin as possible, but this of course detracts from the abrasion resistance. Any insulation must also be non-flammable and should also be highly stretchable or extensible without breaking. This latter requirement is particularly important in telecommunications equipment because of the tortuous paths of the wires and their constant changes in position. Hence, if an unsuitable insulating material is used, then cracked or split insulation results in baring of the conductor.

The use of irradiated cross-linked insulating layers has been suggested previously, but this has been on high voltage cable where different considerations apply from those found with low voltage electrical wire for telecommunications equipment. Such high voltage cable would not be subjected to the elongation stresses and reversal of these stresses as in low voltage wire partly because its thickness does not intend it to be distorted into tortuous paths and over relatively short distances. Also high voltage cable is laid in positions of use and is then normally not disturbed during its useful life. Hence, while the previously known cross-linked insulation layers may have been useful for their desired purposes, their design took no account of elongation stresses.

It has also been proposed to use an irradiation cross-linkable medium which is between 10 and 50 phr (parts per hundred) of the total composition. Such medium itself must contain at least 50% difunctional monomer. A further inclusion in the crosslinkable medium has been proposed of at least one cyclic ether to stabilize against development of colour centres, this further inclusion being about 20% of the total medium. Such formulations are disclosed in U.S. Pat. No. 3,623,940 issued Nov. 30, 1971 and Canadian Pat. No. 971,694 issued July 22, 1975.

Compounds using existing formulating procedures do not have adequate properties of flexibility, abrasion resistance and non-flammability while being sufficiently extensible to satisfy the requirements of low voltage electrical wires. In fact, such types of compounds are known to have degrees of extensibility before break which are not substantially different from conductor used in low voltage electrical wires. It follows that in a conductor covered by insulation formed from one of these compounds, the insulation would break under tension substantially simultaneously with the conductor so as to expose bare conductor ends.

It is an object of the present invention to provide a low voltage electrical wire for telecommunications equipment wherein the insulation has acceptable flexibility abrasion resistance and resistance to flammability while also being sufficiently extensible to avoid broken conductor ends.

Accordingly, the present invention provides a low voltage electrical wire for telecommunications equipment comprising an electrical conductor surrounded solely by two layers consisting of an inner layer of polyolefin insulating material surrounding and directly upon the conductor, and an outer layer surrounding the inner layer, the outer layer being a layer of irradiation cross-linked insulation composed of PVC, a mixture of difunctional and trifunctional acrylic monomers and a plasticizer, the PVC content being over 50% and less than 79% by weight of the total composition and the mixture of monomers being less than about 30% by weight.

In the above wire according to the invention, the outer layer is thermoset which gives it the required abrasion resistance. It also has a desired degree of heat resistance. The combination of the two layers in the above wire is unique. Whereas the material of the outer layer has a degree of extensibility before breakage which is not substantially different from that of the conductor itself, the inner polyolefin layer, because of its plasticity, acts as a stress relieving layer between core and the outer layer as the inner surface of the inner layer may stretch under the influence of the extending conductor and will absorb a large proportion of the strain even if the layer is very thin so that the outer surface does not extend to the same extent as the inner surface. Hence, while the outer surface of the polyolefin causes the outer layer to stretch with it, the outer layer does not stretch by the same amount as the conductor core when the ends of the conductor are being held, as by terminals, and the stretching load is being applied along it. This results in the outer layer still being unbroken when the conductor breaks thus enabling further extension of the outer layer together with the inner layer so that when the outer layer eventually ruptures, it assists the inner layer in protecting the broken conductor ends.

The invention will be readily understood by the following description of certain embodiments, by way of example, in conjunction with the accompanying FIGURE which is a transverse cross-section through an insulated low voltage electrical wire for telecommunications equipment in accordance with the present invention.

The invention is generally utilized to provide a wire having a conductor surrounded solely by two layers. In the drawing, the conductor is indicated at 10, and the two layers consist of an inner layer 11 of polyolefin insulating material and an outer layer 12 of crosslinked insulation. The material of the conductor 10 is not critical, for example copper or aluminum, or alloys of either of these materials. The conductor may be tinned.

The outer layer 12 is a compound comprising PVC, a crosslinking medium which is a blend of difunctional and trifunctional acrylic monomers of about equal proportions, and a plasticizer. Lead salts, for example tetrabasic lead fumarate, can be included as a stabilizer and finely divided calcium carbonate can be included as a filler. A fire retardant material, such as antimony trioxide, can also be included. The outer layer compound is manufactured by conventional processes, for example dry blending, pellet manufacture, extrusion and then irradiation—up to 10 MRad dose level.

Two typical compounds for the outer layer 12 are as follows:

| | #1 (phr) | % | #2 (phr) | % |
|---|---|---|---|---|
| PVC | 100 | 60.86 | 100 | 52.0 |
| TEGDM | 10 | 6.09 | 10 | 5.2 |
| TMPTM | 10 | 6.09 | 10 | 5.2 |
| TOTM | 20 | 12.17 | 20 | 10.4 |
| DOP | 17 | 10.34 | 17 | 8.84 |
| Stabilizer | 7 | 4.26 | 7 | 3.64 |
| Calcium Carbonate | — | — | 25 | 13.0 |
| Antioxidant | .3 | 18 | .3 | .16 |
| Antimony Trioxide | — | — | 3 | 1.56 |

where TEGDM = Tetraethylene Glycol Dimethacrylate
- a difunctional monomer.
TMPTM = Trimethylolpropane Trimethacrylate
- a trifunctional monomer
TOTM = Trioctyl Trimaletate
- a plasticizer
DOP = Dioctyl Phtalate
- a plasticizer.

The actual ranges of the various constituents of the compound can vary, but the PVC content is over 50%, by weight, of the total composition but less than 79% and in many cases is less than 65%.

The inner layer 11 of polyolefin is applied by conventional means and the material of the layer 11 is manufactured by conventional processes.

As the wire is a low voltage wire and for telecommunications equipment, it has a total diameter up to, or around 1.00 mm. The conductor may be around 0.6 mm diameter and it follows that the combined thickness of the inner and outer layers 11, 12 is around 0.2 mm. Nevertheless, the irradiation cross-linked outer layer offers sufficient abrasion resistance to protect the inner layer and the conductor in usage for the particular type of requirements of such a wire in switchboard or main frame wiring. It also gives the required degree of non-flammability.

The particular combination of materials in the outer layer make it easily removed to make terminal connection, by deliberate and positive contact with a soldering iron which burns it away. On the other hand, the outer layer offers sufficient heat resistance to prevent burning when a hot soldering iron is accidentally touched against it. Thus, the wire is easily strippable for making terminal connections.

While the extensibility at break of the material of the outer layer is substantially the same as that of the conductor, the combination of the particular inner and outer layers according to the invention is unique in that it offers advantages additional to those found if insulation of polyolefin or of the crosslinked material were used above. This is that the polyolefin, because of the properties of the material, acts as a stress relieving means for the outer layer 12. Thus if axial tensile stress is applied to the conductor, the inner surface of the polyolefin inner layer is forced to stretch by the same amount as the conductor. Because the polyolefin is capable of absorbing a large proportion of the strain because relative movement between molecules is possible, then the outer surface of the inner layer stretches to a lesser extent than the inner surface particularly as resistance is being offered to extension by the outer layer 12. Even where the inner layer is thin as in this case, stress and strain at its outer surface is less than at the inner surface of this construction.

Hence, the outer layer stretches to a lesser degree than the conductor while placing the inner layer in axial shear. It follows that when the conductor has stretched to its breaking point and then fails, the outer layer 12 is still capable of further stretching because its breaking point has not been reached. Extra stretching of the layers of insulation under further pull then takes place while the outer layer still gives its flammability and abrasion resistance. If the outer layer then eventually breaks, it will have stretched beyond the broken conductor ends so as to give protection to these ends and assist the protection given by the inner layer. The inner layer, of course, should sever after further extension because of its greater extensibility.

What is claimed is:

1. A low voltage electrical wire for telecommunications equipment comprising:

(a) an electrical conductor, the conductor being surrounded solely by two layers consisting of an inner layer and outer layer in which;

(i) the inner layer is of polyolefin insulating material surrounding and directly upon the conductor and is more plastic than the outer layer and is a stress relieving layer for the outer layer; and (ii) the outer layer surrounding the inner layer, said outer layer being an abrasion resistant and flame resistant layer of irradiation crosslinked insulation material consisting essentially of PVC, a mixture of difunctional and trifunctional acrylic monomers and a plasticizer, the PVC content being over 50% and less than 79% by weight of the total composition and the mixture of monomers being less than 30% by weight.

2. A wire as claimed in claim 1, the difunctional and trifunctional monomers being of about equal proportions.

3. A wire as claimed in claim 1, said PVC content being over 50% and less than about 65%.

4. A wire as claimed in claim 1, said material of the outer layer containing a stabilizer.

5. A wire as claimed in claim 1, said material of the outer layer containing a fire retardant material.

6. A wire as claimed in claim 1, said material of the outer layer containing a filler.

* * * * *